United States Patent [19]

Schwab

[11] Patent Number: 4,864,839
[45] Date of Patent: Sep. 12, 1989

[54] ACTUATING ARRANGEMENT FOR A RIVET SETTING TOOL

[75] Inventor: Manfred Schwab, Taunusstein, Fed. Rep. of Germany

[73] Assignee: Alfred Honsel Nieten- und Metallwarenfabrik GmbH & Co., Frondenberg, Fed. Rep. of Germany

[21] Appl. No.: 300,751

[22] Filed: Jan. 23, 1989

Related U.S. Application Data

[63] Continuation of Ser. No. 123,853, filed as PCT EP87/00047 on Jan. 31, 1987, published as WO87/04647 on Aug. 13, 1987, abandoned.

[30] Foreign Application Priority Data

Feb. 5, 1986 [DE] Fed. Rep. of Germany ...... 3603421

[51] Int. Cl.$^4$ ............................................. B21J 15/06
[52] U.S. Cl. ................................... 72/391; 72/453.17
[58] Field of Search ............... 72/391, 453.17, 453.16, 72/114; 29/243.53

[56] References Cited

U.S. PATENT DOCUMENTS

| | | | |
|---|---|---|---|
| 3,367,166 | 2/1968 | Newton et al. | 72/453.17 |
| 3,555,649 | 1/1971 | Rigot et al. | 72/391 |
| 3,898,833 | 8/1975 | Richardson | 72/391 |
| 4,089,202 | 5/1978 | Schwab | 72/391 |
| 4,454,746 | 6/1984 | Schwab | 72/391 |
| 4,535,925 | 8/1985 | Ramey et al. | 72/391 |

FOREIGN PATENT DOCUMENTS

| | | | |
|---|---|---|---|
| 1292113 | 4/1969 | Fed. Rep. of Germany | 72/391 |
| 3330891 | 3/1985 | Fed. Rep. of Germany | 72/391 |
| 2301319 | 9/1976 | France | 72/391 |
| 1471824 | 4/1977 | United Kingdom | 72/391 |
| 2100644 | 1/1983 | United Kingdom | 72/391 |
| 1180143 | 9/1985 | USSR | 72/391 |

OTHER PUBLICATIONS

"2415 Revve Technique Diesel" Sept. 1982 No./17 Boulogne, Billancourt, France

Primary Examiner—David Jones
Attorney, Agent, or Firm—Barnes, Kisselle, Raisch, Choate, Whittemore & Hulbert

[57] ABSTRACT

A rivet setting tool comprises a feed device which can be actuated for a rivet upsetting operation and which imparts an axial movement to the rivet pin. The feed device includes a piston-cylinder assembly formed by a working piston and a pressing piston. A trigger is arranged to apply pressure to a control valve rod which by its movement opens and closes communicating openings for a pressure fluid in the tool. The trigger is movable in a plane which is inclined with respect to the axis of the control valve rod and when actuated comes into sliding contact by means of a lower rearward edge with an upper end face of the control valve rod to displace it axially.

12 Claims, 2 Drawing Sheets

ACTUATING ARRANGEMENT FOR A RIVET SETTING TOOL

This application is a continuation of application Ser. No. 123,853, filed as PCT EP87/00047 on Jan. 31, 1987, published as WO87/04647 on Aug. 13, 1987 now abandoned.

BACKGROUND OF THE INVENTION

In one form of rivet setting tool for setting screwthreaded rivet nuts or blind rivet nuts or the like, referred to hereinafter for the sake of simplicity as rivet nuts, the tool comprises a forward feed assembly which is actuable to perform the rivet nut upsetting operation and which is adapted to impart an axial movement to the screwthreaded pin or the tensile pin for setting of the rivet. The tool comprises a trigger which, by applying a pressure to a control valve rod, moves the rod to close or open communicating openings for a pressure fluid in the tool, to provide for actuation thereof. The forward feed assembly comprises a piston cylinder arrangement including a pressing piston and a working piston and the tool itself comprises a body portion in which the working piston is disposed, together with a working piston rod, and a handle portion in which the pressing piston with its pressing chambers is arranged.

The above-mentioned trigger of the tool is arranged to control the flow of pressure fluid in the handle portion of the tool and is disposed at a location on the tool where the handle portion connects to the body portion carrying the working piston of the tool. The control valve rod which is actuated by the trigger extends longitudinally in the handle portion and the upper end of the rod is pivotally connected to the trigger by way of an intermediate connecting lever. The trigger itself is mounted pivotably about a pivot pin and displaces the control valve rod by way of the intermediate lever, when the trigger is caused to pivot about its pivot pin by for example a finger pressure applied thereto.

That construction however suffers from the disadvantage that, when actuating the trigger to operate the tool, it is necessary to overcome certain pressure points in the movement of the trigger, which occur due to the fact that the pivotal movement of the trigger about its pivot mounting pin has to be converted into a translatory movement of the control valve rod by way of the intermediate lever. Furthermore, the design configuration is such that the actuating arrangement is comparatively susceptible to trouble and is complicated from the point of view of assembly.

SUMMARY OF THE INVENTION

An object of the present invention is to provide an actuating arrangement for a rivet setting tool, in which actuation thereof is facilitated and reliability is enhanced.

Another object of the invention is to provide an actuating arrangement for a rivet setting tool, which is of a substantially simpler design configuration than previous designs.

Still another object of the present invention is to provide a rivet setting tool actuating arrangement which is of a design better suited to the conditions under which such a tool is generally operated.

A further object of the invention is to provide a rivet setting tool actuating arrangement which gives a smooth operating movement without points of increased resistance therein, thereby providing for better control of the tool by an operator.

Still a further object of the present invention is to provide a rivet setting tool having an actuating arrangement operated by a trigger member, without the need for a connecting linkage of relative complexity between the trigger member and the operating members of the actuating arrangement, thereby also avoiding the possibility of play and slack in the mechanism between the trigger member and the actuating arrangement.

Yet another object of the present invention is to provide a rivet setting tool having an actuating arrangement which produces smooth and consistent response on the part of the tool, from one rivet setting operation to another.

In accordance with the present invention, those and other objects are achieved by a rivet setting tool for setting rivet nuts, comprising a feed means which can be actuated for the rivet upsetting operation and which is operable to impart an axial movement to the screwthreaded pin or tensile pin of the rivet member to be set. The feed means comprises a piston-cylinder assembly formed by a pressing piston and a working piston. The actuating arrangement further includes a trigger member adapted to apply a pressure force to a control valve rod which is thus operable to open and close communicating openings for a pressure fluid in the tool. The trigger member is so arranged as to be displaced, in operation thereof, substantially in a plane which is inclined with respect to the axis of the control valve rod, a rearward lower edge of the trigger member which is towards the control valve rod coming into contact with an upper end face thereof to cause axial displacement of the control valve rod.

In a preferred feature of the invention, the actuating arrangement comprises guide means for guiding the trigger member in its actuating movement, with the guide means extending inclinedly with respect to the axis of the control valve rod. The guide means may be of a cylindrical or at least substantially cylindrical configuration, around the trigger member, or the guide means may comprise guide track means which are arranged in parallel relationship.

Another advantageous feature of the invention provides that the trigger member is arranged to be returned to its starting or non-actuated position by spring means bearing against the back of the trigger member and supported against a suitable part of the casing of the tool. The spring means may preferably comprise a coil spring and the trigger member may preferably have a recess such as a bore for accommodating the spring means. The arrangement may further include adjusting means for adjusting the force of the spring means, thereby to vary the actuating force required for operation of the trigger member.

In another preferred feature of the invention, the trigger member may be provided with a recess therein, and the arrangement further includes a screw which is fixed to the casing of the tool to limit the movement that the trigger member can perform. In a modified form of that construction, the trigger may include recesses at both sides thereof which are adapted to receive screw members fixed to the casing of the tool. Furthermore, the trigger member may have a plurality of recesses which are disposed in the longitudinal direction thereof while the casing of the tool may carry a plurality of screw members which are adapted to be brought selectively into engagement with the above-mentioned recesses, thereby to permit different control movements in respect of the control valve rod.

In order to reduce the susceptibility to wear of the co-operating parts of the trigger member and the control valve rod, it may be provided that the edge of the trigger member which comes into contact with the control valve rod in order thereby to displace same in its axial direction may be reinforced, as for example by hard chromium plating.

Further objects, features and advantages of a rivet setting tool actuating arrangement in accordance with the present invention will be apparent from the following description of a preferred embodiment thereof.

DESCRIPTION OF THE PREFERRED EMBODIMENT

Figure 1:
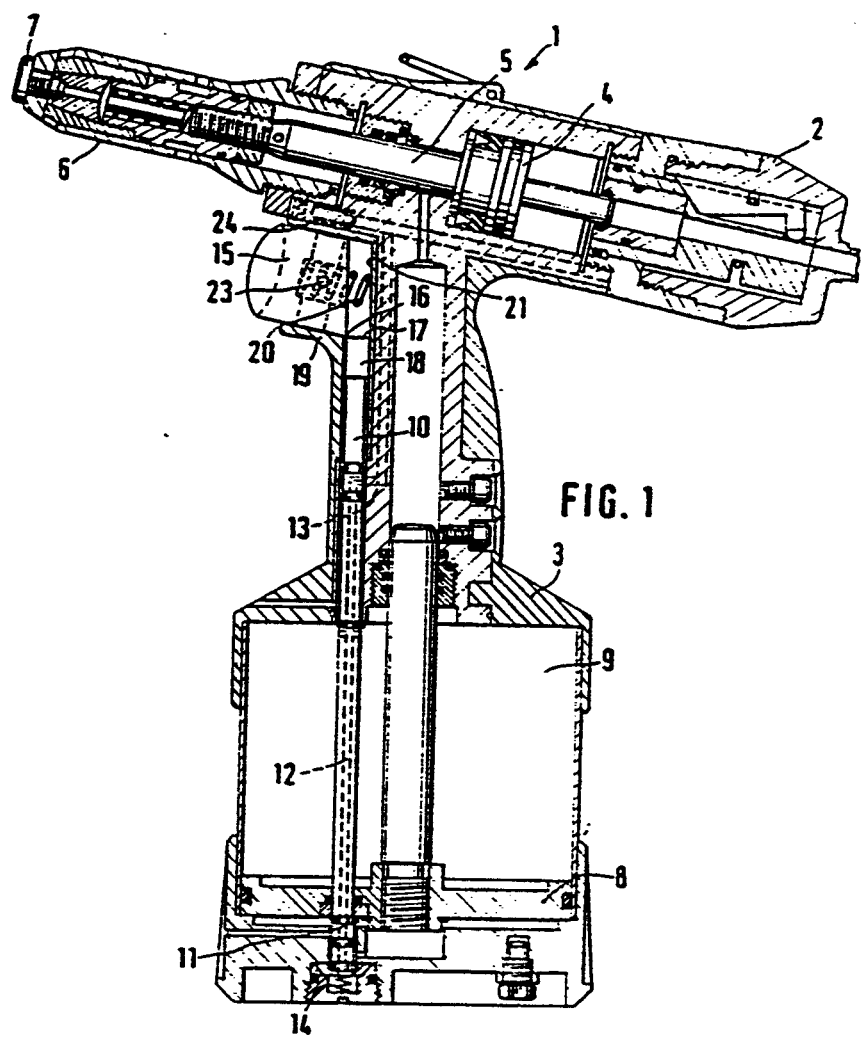
FIG. 1 is a sectional side view of a rivet setting tool with an actuating arrangement, in accordance with the invention.

Referring firstly to FIG. 1, shown therein is a rivet setting tool indicated generally by reference numeral 1 for setting for example screwthreaded rivet nuts or blind rivet nuts, comprising a body portion 2 and a gripping or handle portion 3. Disposed in the body portion 2 is an operating or working piston 4, such as a hydraulic piston, with a working piston rod 5 which is operable in conjunction with a mouthpiece 6 at the front end of the body portion 2, which is thus towards the left in FIG. 1, in order to carry out the working operations using a rivet as indicated at 7.

The handle portion 3 carries therein a pressing piston 8 which is disposed in a pressure chamber 9 and which thus divides the pressure chamber 9 into first and second chamber portions, for actuation of the tool.

The rivet setting tool 1 further includes a control valve rod 10 which at its lower end as indicated at 11 in FIG. 1 is provided with valve seat configurations and which has a passage or duct 12 extending therethrough. Provided in the handle portion 3 at a position adjacent an upper part of the valve rod 10 is a passage in the form of a bore as indicated at 13. The passage 12 in the valve rod 10, in an actuated position of the valve rod 10, can align with and thus communicate with the bore 13 in the handle portion 3, thus forming a communication from the pressure chamber 9 to the cylinder arrangement in which the working piston 4 is slidable. In that way it is possible to control the supply of pressure fluid from the pressure chamber 9 in the handle portion 3 to the working piston 4 in the body portion 2, by way of the control valve rod 10 and more specifically by virtue of the movement thereof in its longitudinal or axial direction. That control procedure is set forth in German patent application No P 35 32 932.7 to which reference should therefore be made. Reference might also be made to my co-pending application Ser. No. 63 141.

In order to impart a control movement downwardly in FIG. 1 to the control valve rod 10, in opposition to the force of a spring 14 which urges the control valve rod 10 upwardly in the handle portion 3, the tool includes a pressing member in the form of a trigger 15 which is so positioned as to be at an angle with respect to the axis of the control valve rod 10 and which is also movable in an inclined position, that is to say, at the angle to the axis of the control valve rod 10. The trigger 15 has a lower rearward edge as indicated at 16, which is towards the control valve rod 10 and which is adapted to come into contact with an upper end face 17 on an end portion 18 of the rod 10 so that when the trigger 15 is moved by being depressed and thus caused to slide towards the left in FIG. 1 and slightly downwardly along its inclined path of movement, the lower rearward edge 16 of the trigger 15 applies a pressure to the end face 17 of the end portion 18 of the rod 10 and thus displaces it downwardly against the force of the spring 14.

Reference numeral 19 in FIG. 1 diagrammatically denotes a guide means for guiding the trigger 15 in its actuating movement. The guide means 19 may be of a cylindrical configuration around the trigger 15 and may be formed by a suitable part of the casing of the tool. It is also possible however for the guide means for the trigger 15 to comprise guide track portions which are arranged in parallel relationship. A spring 20 is arranged behind the trigger 15, that is to say towards the right thereof in FIG. 1, to urge the trigger 15 towards the left in FIG. 1 and thus into its non-actuated condition. The spring 20 is supported against a suitable wall portion 21 of the casing forming the handle portion 3 of the tool. The spring 20 may be for example a coil spring.

Figure 2:
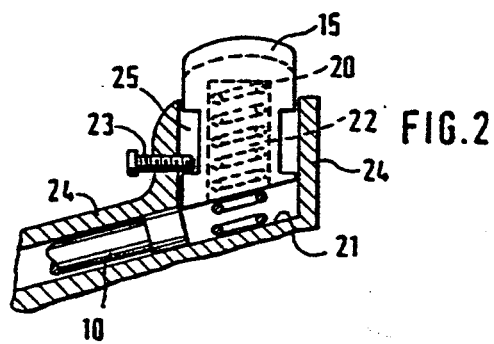
FIG. 2 is a side view of the actuating arrangement of the tool shown in FIG. 1, on an enlarged scale and partly in section, in a non-actuated condition.
Figure 3:
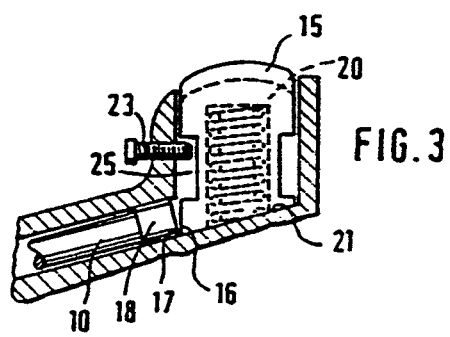
FIG. 3 is a view corresponding to that shown in FIG. 2, illustrating the actuating arrangement in an actuated condition.

Reference will now further be made to FIGS. 2 and 3 showing in greater detail the way in which the trigger 15 is urged towards the non-actuated condition thereof by means of the coil spring 20 which at its end remote from the trigger 15 bears against a wall portion 21 of the casing of the tool. The coil spring 20 is accommodated in a suitable recess in the form of a bore 22 in the back of the trigger 15, with the bore 22 thus being open rearwardly of the trigger, that is to say, towards the wall portion 21 of the casing of the tool.

As shown in FIG. 2, the coil spring 20 urges the trigger 15 away from the wall portion 21 of the casing of the tool, but that movement is limited by at least one screw as indicated at 23 and which is carried in the casing portion 24 of the handle portion 3 of the tool. The free end or tip of the screw 23 engages into an elongate recess 25 formed in the trigger 15 in the underside thereof, and thus serves to prevent the trigger 15 from sliding completely out of its guide arrangement formed by the casing portion 24.

FIG. 3 shows the position of the FIG. 2 actuating arrangement that the trigger 15 occupies when it is pressed inwardly of the casing of the tool, against the force of the coil spring which is thus compressed when the trigger 15 is actuated in that way. When the trigger 15 moves from the position shown in FIG. 2 into the position shown in FIG. 3, the lower rearward edge 16 of the trigger 15 slides against the end face 17 of the end portion 18 of the valve rod 10 and in so doing urges it downwardly as illustrated in FIG. 1, in other words, in FIGS. 2 and 3, the valve rod 10 is displaced towards the left and downwardly by actuation of the trigger 15. The recess 25 in the underside of the trigger 15 is sufficiently long to permit the actuating movement of the trigger, without being impeded by the screw 23, thus to ensure proper operation of the control valve rod 10. As soon as the trigger 15 is released again, the coil spring 20 urges the trigger 15 away from the wall portion 21 of the casing and thus back into the rest position shown in FIG. 2. As mentioned above, in that position of the trigger 15 the screw 23 prevents the trigger from falling out of its guide arrangement or the casing of the handle portion 3.

The spring force applied to the trigger 15 by the coil spring 20 may be adapted to be adjustable, by any suitable form of adjusting means such as a screw member so as to vary the force resisting actuation of the trigger 15 and thus to adjust the level of sensitivity of the actuating arrangement and the tool.

As shown in FIGS. 2 and 3, the recess 25 may be such as to extend around the trigger 15, or it is possible to provide respective recesses on both sides of the trigger 15, with corresponding screws 23 carried by the casing of the tool and arranged to engage into the respective recesses in the trigger member.

In order to permit different control movements of the control valve rod 10 by means of the trigger 15, the actuating arrangement may be so designed that a plurality of recesses as indicated at indicated at 25 in FIGS. 2 and 3 are arranged one behind the other in the longitudianl direction of the trigger 15, with a plurality of screws 23 which are carried by the casing portion 24 of the tool being selectively engageable into the respective recesses 25.

If appropriate, the edge 16 of the trigger 15 may be strengthened, as for example by hard chromium plating, in order to reduce the amount of wear that may occur at the edge of the trigger 15, due to the sliding co-operation thereof with the end face 17 of the valve rod 10.

It will be appreciated that the above-described embodiment of the tool and actuating arrangement according to the invention has been set forth solely by way of example of the principles thereof and that various modifications and alterations may be made therein without thereby departing from the spirit and scope of the invention.

I claim:

1. An actuating arrangement for a rivet setting tool for setting rivet nuts comprising a forward feed means adapted to be actuated for an upsetting operation and adapted to impart an axial movement to the rivet pin and including a pressure fluid operated piston-cylinder means having a pressing piston and a working piston, said actuating arrangement including a movable elongate control valve rod having an axis and an upper end face, said control valve rod being adapted by its movement along said axis to open and close communications for pressure fluid in the tool, and having an upper end face and trigger means comprising a cylindrical body, means for guiding said cylindrical body in an inclined path such that when it is pressed, it moves along an axis inclined and intersecting with respect to the axis of the control valve rod, said cylindrical body having a rearward lower edge which directly contacts said upper end face of the valve rod to cause displacement thereof.

2. An arrangement as set forth in claim 1 and further comprising a casing portion and a spring means disposed between the rear side of said trigger means and said casing portion, to urge said trigger means towards its non-actuated condition.

3. An arrangement as set forth in claim 2 wherein said spring means is a coil spring.

4. An arrangement as set forth in claim 3 wherein said trigger means has a recess in which said spring means is disposed.

5. An arrangement as set forth in claim 4 wherein said recess comprises a bore.

6. An arrangement as set forth in claim 3 and further including means for adjusting the force of said spring means.

7. An actuating arrangement for a rivet setting tool for setting rivet nuts comprising a forward feed means adapted to be actuated for an upsetting operation and adapted to impart an axial movement of the rivet pin and including a pressure fluid operated piston-cylinder means having a pressing piston and a working piston, said actuating arrangement including a movable elongate control valve rod having an axis and an upper end face, said control valve rod being adapted by its movement along said axis to open and close communications for pressure fluid in the tool, and trigger means, means for guiding said trigger means such that when it is pressed, it moves in a plane inclined with respect to the axis of the control valve rod, said trigger means having a rearward lower edge which contacts said upper end face of the valve rod to cause displacement thereof, said trigger means having a recess and further including a screw means in the case of the arrangement to limit the motion of the trigger means.

8. An arrangement as set forth in claim 7 and including recesses at first and second sides of said trigger means, and screw means in the casing of the arrangement and engaging into said recesses.

9. An arrangement as set forth in claim 7 wherein said trigger means has a plurality of recesses disposed in the longitudinal direction thereof and wherein the casing of the arrangement carries a plurality of screw means adapted to be brought selectively into engagement with said recesses thereby to permit different control movements of said control valve rod.

10. An arrangement as set forth in claim 1 wherein said edge of the trigger means which is adapted to come into contact with said control valve rod is strengthened.

11. An arrangement as set forth in claim 10 wherein said edge is hard-chromium plated.

12. In a rivet setting tool comprising a tool body including a body portion having a cylindrical cavity and a handle portion; a pressure fluid inlet means on said tool body; a first piston slidably disposed in said cylindrical cavity in said tool body and defining first and second chambers at respective sides of said first piston; rivet setting means operable by said first piston; a second piston slidably disposed in a further cylinder cavity in said tool body and defining first and second chambers at respective sides of said second piston; an operating means operatively connected to said second piston and adapted in operation of the tool to produce a fluid pressure in said first chamber of said first piston thereby to urge same in a direction towards its said second chamber to perform a rivet setting operation, by virtue of said second piston being urged towards its second chamber by fluid pressure in its first chamber; passage means communicating said inlet means with said first and second chambers associated with said second piston; passage means communicating said inlet means with said second chamber associated with said first piston; and control valve means including a movable control valve rod adapted to control the supply of pressure fluid selectively to said chambers, an actuating arrangement including trigger means comprising a cylindrical body adapted to operate said control valve rod, said control rod having face means, said cylindrical body providing an actuating face means directly cooperable with said face means on said control valve rod to produce the actuating movement thereof, and a guide means for guiding said cylindrical body in its actuating movement in a place which is inclined with respect to said face means on said control valve rod.

* * * * *